(12) United States Patent
Urushibata et al.

(10) Patent No.: US 9,245,264 B2
(45) Date of Patent: Jan. 26, 2016

(54) READING APPARATUS

(71) Applicant: TOSHIBA TEC KABUSHIKI KAISHA, Shinagawa-ku, Tokyo (JP)

(72) Inventors: Yoshimi Urushibata, Shizuoka (JP); Toshihiro Kaneko, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/607,152

(22) Filed: Jan. 28, 2015

(65) Prior Publication Data

US 2015/0227907 A1     Aug. 13, 2015

(30) Foreign Application Priority Data

Feb. 10, 2014   (JP) ................................. 2014-023602

(51) Int. Cl.
```
G06Q 40/00      (2012.01)
G06Q 20/20      (2012.01)
A47F 9/04       (2006.01)
G07G 1/00       (2006.01)
G07G 1/12       (2006.01)
```
(52) U.S. Cl.
CPC ............. *G06Q 20/204* (2013.01); *A47F 9/04* (2013.01); *G06Q 20/208* (2013.01); *G07G 1/0018* (2013.01); *G07G 1/0036* (2013.01); *G07G 1/0045* (2013.01); *G07G 1/12* (2013.01)

(58) Field of Classification Search
USPC .................................................. 235/375, 379
See application file for complete search history.

(56) References Cited

U.S. PATENT DOCUMENTS

| | | | |
|---|---|---|---|
| 5,900,614 A * | 5/1999 | Nakakawaji et al. | 235/462.14 |
| 6,390,363 B1 * | 5/2002 | Morrison et al. | 235/383 |
| 7,970,650 B2 * | 6/2011 | Tokorotani | 705/17 |
| 8,020,761 B2 * | 9/2011 | Lum | 235/380 |
| 8,944,322 B2 * | 2/2015 | White | 235/383 |

FOREIGN PATENT DOCUMENTS

JP        2000-067322        3/2000

* cited by examiner

*Primary Examiner* — Christle I Marshall
(74) *Attorney, Agent, or Firm* — Amin, Turocy & Watson, LLP

(57) ABSTRACT

In accordance with one embodiment, a reading apparatus, arranged at a position between an operator and a customer who stand in a face to face manner, comprises a main body having an opening on a surface thereof facing the operator, an image capturing section for operator, housed in the main body, configured to photograph a commodity through the opening of the main body to capture an image of the commodity, and a reading section for customer, arranged on the main body, configured to communicate with an object, which is held by the customer and is capable of realizing near field communication, to read specified additional information stored in the object.

5 Claims, 7 Drawing Sheets

FIG.2
(a)
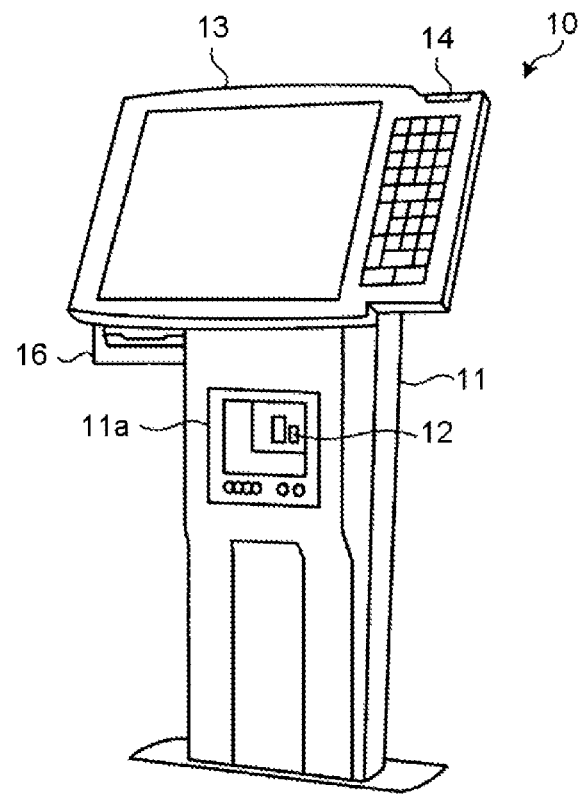
(b)
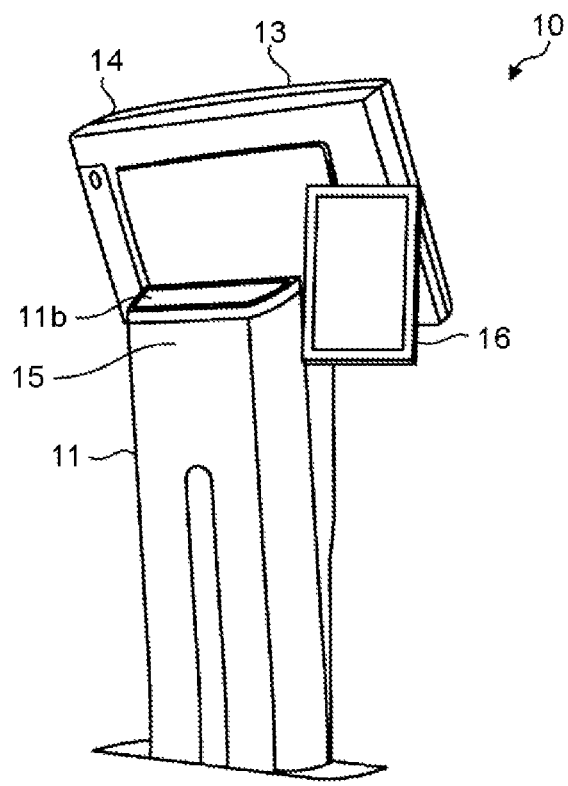

READING APPARATUS

CROSS-REFERENCE TO RELATED APPLICATION

This application is based upon and claims the benefit of priority from Japanese Patent Application No. 2014-023602, filed Feb. 10, 2014, the entire contents of which are incorporated herein by reference.

FIELD

Embodiments described herein relate generally to a reading apparatus.

BACKGROUND

In a store such as a supermarket and the like, a customer who purchases commodities puts displayed commodities in a shopping basket or a cart and carries the shopping basket or cart to a checkout counter. A shop clerk carries out checkout work at the checkout counter. A reading apparatus such as a barcode scanner for reading commodity information is arranged on the checkout counter. The shop clerk, standing at a position opposite to the customer across the checkout counter, reads the commodities brought by the customer one by one through the reading apparatus to input information relating to the commodity to be purchased.

Conventionally, there are provided various services for promoting sales in the store. For example, points are given according to the purchase amount and stored cumulatively in a store server in association with identification information (membership number and the like) of customers. The given points are used to receive a discount or exchange a commodity corresponding to the point amount from the next transaction and thereafter. Further, an IC card (membership card) including an IC tag in which the identification information is stored is used for sending and receiving the identification information.

Incidentally, in the constitution of the conventional checkout counter, for example, in a case in which the customer shows the membership card to the operator to receive points, the work of the operator (shop clerk) is interrupted, or the customer has to show the membership card before the registration work of the shop clerk is started or after the registration work of the shop clerk is completed, in general. As a result, there is a possibility that the work efficiency of the shop clerk is dropped. Further, there is a problem that showing the card is too troublesome for customers.

BRIEF DESCRIPTION OF THE DRAWINGS

FIG. 2 is a perspective view illustrating a reading apparatus;

DETAILED DESCRIPTION

In accordance with one embodiment, a reading apparatus, arranged at a position between an operator and a customer who stand in a face to face manner, comprises a main body, an image capturing section for operator and a reading section for customer. The main body includes an opening on the surface thereof facing the operator. The image capturing section is housed in the main body to photograph a commodity through the opening of the main body to capture an image of the commodity. The reading section is arranged on the main body to communicate with an object, which is held by the customer and is capable of realizing near field communication, to read specified additional information stored in the object.

Figure 1:
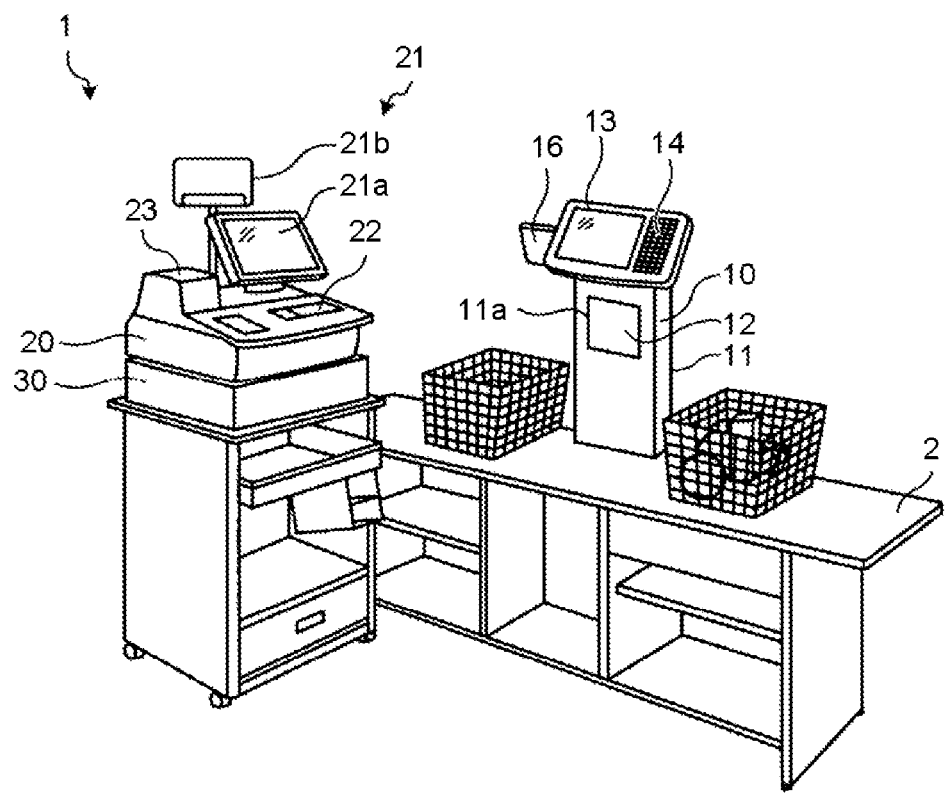
FIG. 1 is a diagram illustrating the whole constitution of a POS system according to one embodiment.

Hereinafter, the present embodiment is described in detail with reference to the accompanying drawings. FIG. 1 is a perspective view illustrating the whole constitution of a POS system 1 according to the embodiment.

As shown in FIG. 1, the POS (Point Of Sales) system 1 (store system) includes a reading apparatus 10 serving as a vertical scanner, and a POS terminal 20 serving as a commodity sales data processing device for executing sales registration processing according to an image captured by the reading apparatus 10. The reading apparatus 10 is arranged on a checkout table 2, on which shopping baskets and the like are placed, at a position (substantially central portion) where an operator and a customer stand in a face to face manner. The POS terminal 20 is arranged nearby one of the end portions of the checkout table 2. The reading apparatus 10 and the POS terminal 20 are connected with each other to be capable of communicating through a transmission line (not shown). The reading apparatus 10 and the POS terminal 20 constitute the store system.

The POS terminal 20 executes sales registration processing including checkout processing based on various kinds of data of the commodities purchased by the customer. The POS terminal 20 is arranged above a drawer 30 which stores coins and bills in such a manner that coins and bills can be put in and taken out freely. The POS terminal 20 is equipped with two display devices 21 including a display for operator 21a and a display for customer 21b, an input device 22 including a keyboard and a mode key, and a receipt printer 23. The display device 21 and the input device 22 constitute a user interface having an information input function for inputting information by the user and an information output function for outputting information to the user.

Next, the constitution of the reading apparatus 10 is described with reference to FIG. 2. FIG. 2(a) is a perspective view illustrating the reading apparatus 10 at a side of the apparatus 10 where an image capturing window 11a is arranged. FIG. 2(b) is a perspective view illustrating the reading apparatus 10 at a side of the apparatus 10 opposite to the side where the image capturing window 11a is arranged.

As shown in FIG. 2, the reading apparatus 10 includes a main body 11, an image capturing section 12, a first display section 13, a keyboard 14, a reading section 15 and a second display section 16.

The main body 11 is formed into a substantially rectangular shape and is arranged on the checkout table 2. The height of the main body 11 on the checkout table 2 is, for example, preferred to be as high as the eyes of an operator.

The image capturing window 11a (opening) is arranged on the surface of the main body 11 facing the operator who stands in front of the reading apparatus 10. The image capturing section 12 is arranged inside the main body 11 behind the image capturing window 11a. The operator holds the commodity brought by the customer over the image capturing window 11a to read (photograph) the commodity. The image capturing section 12 is an image sensor including an image capturing element such as a CCD (Charge Coupled Device), a CMOS (Complementary MOS) and the like. The image capturing section 12 photographs the area outside the main body 11 through the image capturing window 11a. Specifically, the image capturing section 12 optically photographs either a code symbol (such as a barcode, a two-dimensional code and the like) attached to the commodity held in front of the image capturing window 11a or the whole or part of that commodity.

The object recognition is described hereinafter. The object recognition refers to a technology in which an object photographed by the image capturing section 12 is specified (recognized) according to feature amount obtained from the appearance of the object. The POS terminal 20 extracts appearance feature of the photographed commodity from the image (object image) captured by the image capturing section 12 as the feature amount, and compares the extracted feature amount with the prepared feature amount (reference data) of a reference commodity to specify (recognize) the photographed commodity. The appearance feature of the commodity refers to the shape, tint, concave-convex state and the like.

The first display section 13, serving as a display for operator, is arranged on the main body 11 above the image capturing window 11a. The first display section 13 is constituted by a display device such as an LCD (Liquid Crystal Display) and the like equipped with a touch panel. The first display section 13 displays commodity name, unit price and the like of the registered commodity to the operator in the sales registration processing carried out by the POS terminal 20.

The keyboard 14 is arranged nearby the first display section 13 in a side by side manner. The keyboard 14 includes various keys and the like for registering the commodity that cannot be registered with the code symbol or object image. It is shown in FIG. 2 that the first display section 13 and the keyboard 14 are arranged integrally, however, they may be arranged separately.

An upper surface 11b of the main body 11 (shown in FIG. 2(b)) is inclined downwards from the operator side to the customer side opposite to the operator side. The reading section 15 is arranged on the inclined surface.

Figure 3:
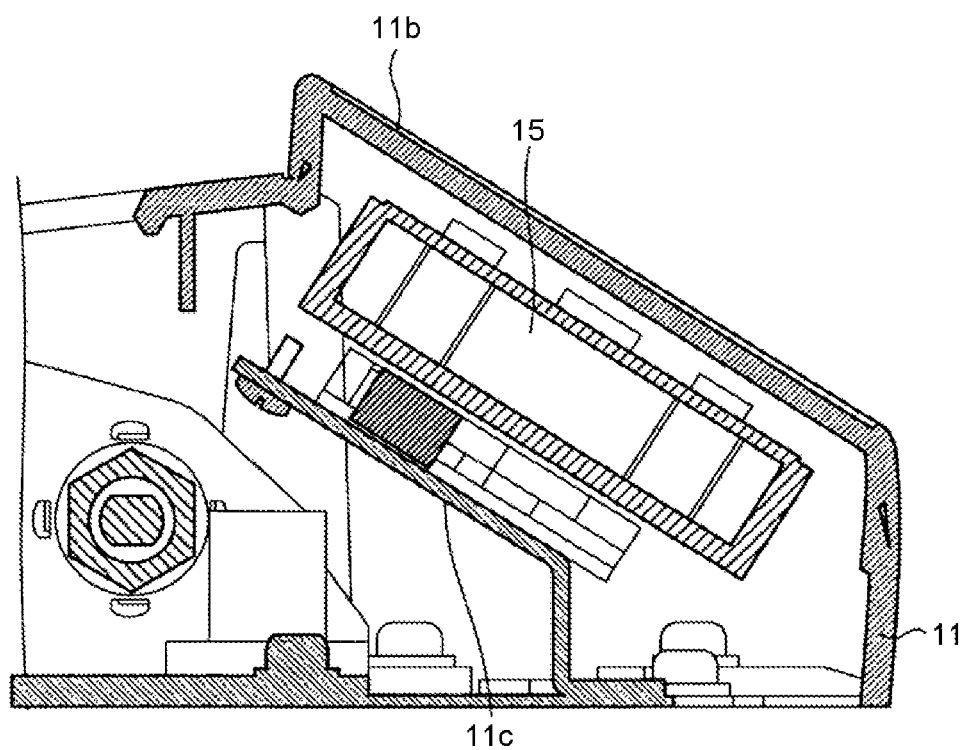
FIG. 3 is a schematic cross-sectional view illustrating the constitution of an upper surface portion of the reading apparatus.

FIG. 3 is a schematic cross-sectional view illustrating the constitution of the upper surface portion of the reading apparatus 10. As shown in FIG. 3, the reading section 15 is arranged directly below (under) the upper surface 11b and supported by a support section 11c and the like to be substantially parallel to the inclined surface of the upper surface 11b. The reading section 15 is a reader device (reader/writer device) for carrying out near field communication (NFC) with a contactless-type IC tag and the like. When an object (hereinafter referred to as a communication-realizable object) capable of realizing near field communication is held in front of the upper surface 11b, the reading section 15 communicates with the communication-realizable object to read information stored in the communication-realizable object as additional information.

The communication-realizable object may be, for example, an IC card (membership card) including an IC tag or an information communication terminal (for example, a mobile phone, a smart phone and the like). No specific limitation is given to the additional information serving as a reading target, and for example, the additional information may include identification information such as a membership number and the like assigned in advance for identifying the customer, service information indicating to provide service such as discount and the like, or electronic settlement information such as electronic money.

The additional information can be read when the customer holds his/her own communication-realizable object over the upper surface 11b of the main body 11. At this time, as the inclined surface is arranged on the upper surface 11b, thus, the customer cannot put the communication-realizable object on the upper surface 11b, and even if the customer puts the communication-realizable object on the upper surface 11b, he/she has to keep holding the communication-realizable object in case the communication-realizable object falls down. Thus, it is possible to prevent that the customer forgets to take away the communication-realizable object put on the upper surface 11b.

In the present embodiment, the reading section 15 is arranged in a state of being buried below the upper surface 11b, however, the present invention is not limited to this. For example, part of the reading section 15 may protrude from the upper surface 11b. In the present embodiment, the reading section 15 is integrally arranged with the main body 11; however, the present invention is not limited to this. For example, the reading section 15 may be arranged separately from the main body 11 in a detachable manner.

Return to the description of FIG. 2. The second display section 16, serving as a display for customer, is arranged nearby the reading section 15. The second display section 16 is constituted by a display device such as an LCD and the like equipped with a touch panel. The second display section 16 displays commodity name, unit price and the like of the registered commodity to the customer in response to the sales registration processing carried out by the POS terminal 20. The second display section 16 further displays a message or an image for instructing the reading by the reading section 15. In addition, it is exemplified in the present embodiment that the second display section 16 is supported at a side of the main body 11 by a supporting member (not shown), however, it is not limited to this.

Figure 4:
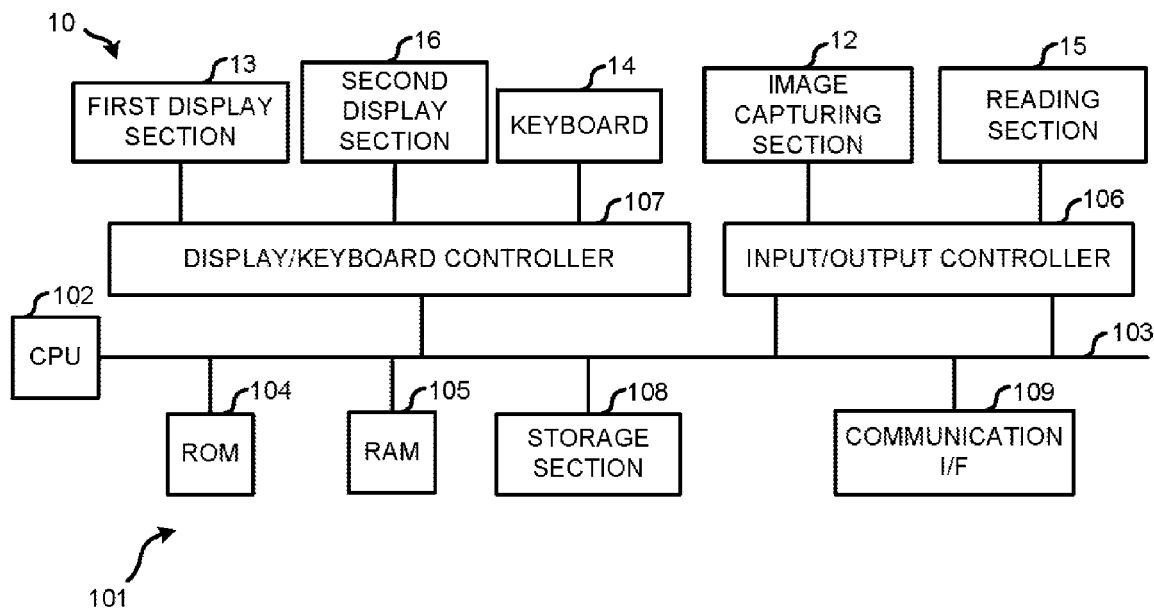
FIG. 4 is a block diagram illustrating the electrical connection of the reading apparatus.

Next, the electrical connection of the reading apparatus 10 is described. FIG. 4 is a block diagram illustrating the electrical connection of the reading apparatus 10. As shown in FIG. 4, the reading apparatus 10 is provided with a microcomputer 101 which controls each section of the apparatus 10. The microcomputer 101 is constituted by connecting a CPU (Central Processing Unit) 102 with a ROM (Read Only Memory) 104 and a RAM (Random Access Memory) 105 through a bus line 103. The CPU 102 functionally controls each section. The ROM 104 stores fixed or basic information such as a control program and the like in advance. The RAM 105 stores various data in a rewritable manner and functions as a work area. Thus, the microcomputer 101 constitutes an information processing section for executing data processing. The entire or part of the RAM 105 is a nonvolatile memory.

The microcomputer 101 is connected with an input/output controller 106, a display/keyboard controller 107, a storage section 108 and a communication interface 109 through the bus line 103.

The input/output controller 106 is connected with the image capturing section 12 and the reading section 15. The input/output controller 106 outputs the image (image data) captured by the image capturing section 12 and the additional information read by the reading section 15 to the microcomputer 101. The input/output controller 106 also outputs a control signal output from the microcomputer 101 to the image capturing section 12 and the reading section 15.

The display/keyboard controller 107 controls the first display section 13 and the second display section 16 to display various images on the display device 21. The display/keyboard controller 107 outputs an operation signal in response to the touch operation on the first display section 13 and the second display section 16 and an operation signal from the keyboard 14 to the microcomputer 101.

The storage section 108 is a storage device such as an HDD (Hard Disk Drive), and an SSD (Solid State Drive). The storage section 108 stores various data relating to the operations of the reading apparatus 10. The communication interface 109 enables the reading apparatus 10 to carry out data communication with other machines (POS terminal 20) through a connecting wire such as a LAN cable and the like. For example, the communication interface 109 sends images and the additional information acquired from the image capturing section 12 and the reading section 15 and operation signal to the POS terminal 20 as input data. The communication interface 109 receives data for display on the first display section 13 and the second display section 16 from the POS terminal 20.

Figure 5:
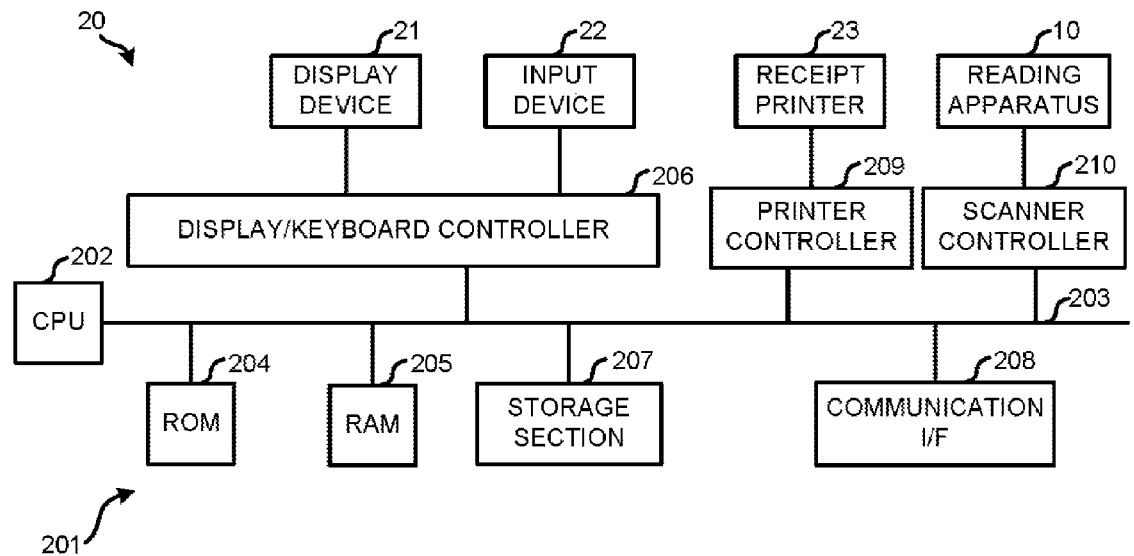
FIG. 5 is a block diagram illustrating the electrical connection of the POS terminal.

Next, the electrical connection of the POS terminal 20 is described. FIG. 5 is a block diagram illustrating the electrical connection of the POS terminal 20. As shown in FIG. 5, the POS terminal 20 is provided with a microcomputer 201 which controls each section of the POS terminal 20. The microcomputer 201 is constituted by connecting a CPU 202 with a ROM 204 and a RAM 205 through a bus line 203. The CPU 202 functionally controls each section. The ROM 204 stores fixed or basic information such as a control program and the like in advance. The RAM 205 stores various data in a rewritable manner and functions as a work area. Thus, the microcomputer 201 constitutes an information processing section for executing data processing. The entire or part of the RAM 205 is a nonvolatile memory.

The microcomputer 201 is connected with a display/keyboard controller 206, a storage section 207, a communication interface 208, a printer controller 209 and a scanner controller 210 through the bus line 203.

The display/keyboard controller 206 controls the display device 21 based on the image data, displays an image corresponding to the image data on the display device 21, and acquires input data from the input device 22 into the microcomputer 201.

The storage section 207 is a storage device such as an HDD and an SSD. The storage section 207 stores various data. The storage section 207 also stores, for example, programs for various processing in the POS terminal 20, a commodity master file, a sales data file and the like (none is shown). The commodity master file stores a unit price, commodity name and the like in association with the commodity code. The sales data file stores transaction number, transaction type, and the sales data in one transaction.

The communication interface 208 enables the POS terminal 20 to carry out data communication with other machines through a connecting wire such as a LAN cable and the like. For example, the communication interface 208 receives the input data sent from the reading apparatus 10. The communication interface 208 also sends a signal for display on the first display section 13 and the second display section 16 to the reading apparatus 10.

The printer controller 209 controls the receipt printer 23 based on the printing data to print an image corresponding to the printing data by the receipt printer 23.

The scanner controller 210 acquires the input data from the reading apparatus 10 into the microcomputer 201. The scanner controller 210 controls the first display section 13 and the second display section 16 to display various images on the first display section 13 and the second display section 16.

Figure 6:
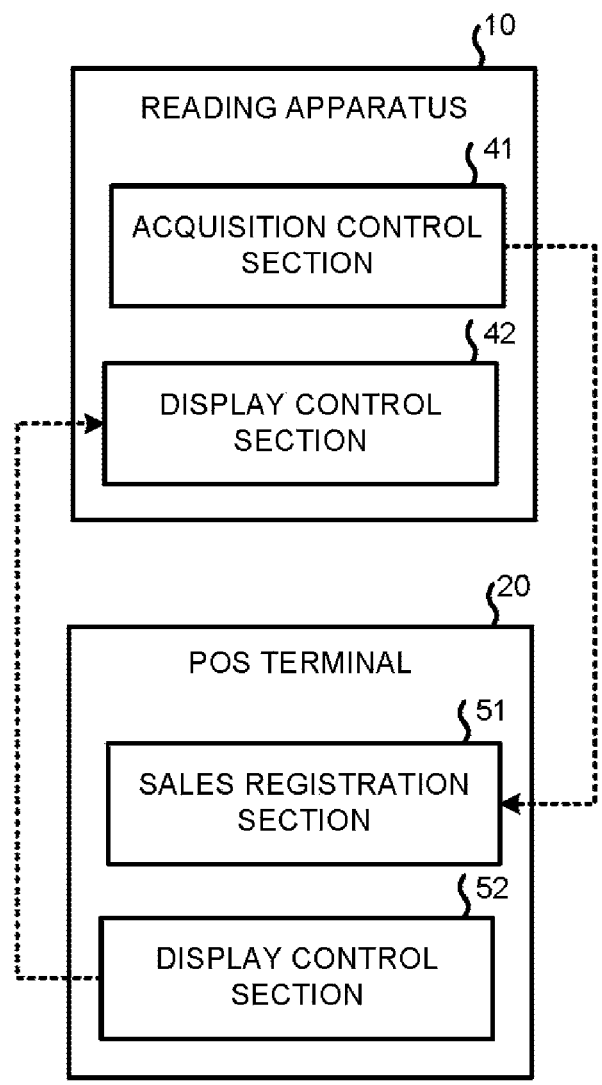
FIG. 6 is a diagram illustrating the functional components of the reading apparatus and the POS terminal.

Next, the functional components of the reading apparatus 10 and the POS terminal 20 are described. FIG. 6 is a diagram illustrating the functional components of the reading apparatus 10 and the POS terminal 20.

The reading apparatus 10 operates according to the programs stored in the storage section 108 to function as an acquisition control section 41 and a display control section 42 as shown in FIG. 6.

The acquisition control section 41 controls acquisition and transmission of the images captured by the image capturing section 12 and the additional information read by the reading section 15. Specifically, the acquisition control section 41 starts acquisition of the images and the additional information through the input/output controller 106 if the transaction start is instructed through an operation on the keyboard 14 or the first display section 13, or a signal notified from the POS terminal 20.

The acquisition control section 41 sends the acquired image data or additional information to the POS terminal 20 through the communication interface 109. The acquisition control section 41 stops the acquisition of the images and the additional information if the end of transaction is instructed through an operation on the keyboard 14 or the first display section 13, or a signal notified from the POS terminal 20. The acquisition control section 41 may stop the operations of the image capturing section 12 and the reading section 15, and in this case, the acquisition control section 41 starts the operations of the image capturing section 12 and the reading section 15 in response to the transaction start instruction described above.

The display control section 42 controls the display of the first display section 13 and the second display section 16. Specifically, the display control section 42 controls the first display section 13 or the second display section 16 to display various kinds of information such as transaction details and a guidance screen described later on the first display section 13 or the second display section 16 based on a display control signal input from the POS terminal 20.

On the other hand, as shown in FIG. 6, the POS terminal 20 operates according to the programs stored in the storage section 207 to function as a sales registration section 51 and a display control section 52.

The sales registration section 51 executes sales registration processing relating to the sales registration of the commodity. The sales registration section 51 notifies the reading apparatus 10 of the transaction start to start the sales registration processing if receiving an operation instructing the transaction start through the input device 22.

In the sales registration processing, the sales registration section 51 carries out sales registration of the commodity based on the image and the additional information input from the reading apparatus 10. Specifically, the sales registration section 51 specifies, according to the image (the image of the code symbol attached to the commodity, or the object image of the whole or part of the commodity) captured by the image capturing section 12, the commodity corresponding to the image from the commodity master file, and carries out sales registration of the specified commodity.

If the additional information (the information stored in the communication-realizable object of the customer) is received, the sales registration section 51 executes the predetermined processing corresponding to the content of the additional information. For example, in a case in which the additional information is the identification information such as a membership number and the like for identifying the customer, the points calculated according to the total amount of the transaction are given in association with the identification information. In a case in which the additional information is service or complementary information indicating to provide a discount and the like, the processing corresponding to the content such as a discount is applied to the total amount of the transaction. In a case in which the additional information is the electronic settlement information such as electronic money and the like, the settlement of the commodity is carried out using the electronic settlement information.

If an operation instructing end of the transaction is received through the input device 22, the sales registration section 51 notifies the reading apparatus 10 of the end of the transaction to terminate the sales registration processing.

The display control section 52 controls the screen to be displayed on the reading apparatus 10 through the cooperation with the display control section 42 of the reading apparatus 10. Specifically, the display control section 52 generates display data of the transaction details corresponding to the sales registration processing carried out by the sales registration section 51 and displays the data on the first display section 13 and the second display section 16. The transaction details include, for example, the commodity name, unit price, total amount. The display control section 52 displays the display data for the transaction details on the second display section 16 from the start of the sales registration processing until at least the transaction is finalized or completely registered. The display control section 52 also displays a message or an image for instructing the reading by the reading section 15 on the second display section 16.

The programs executed in the reading apparatus 10 and the POS terminal 20 of the present embodiment are recorded in a computer-readable recording medium such as CD-ROM, flexible disk (FD), CD-R, DVD (Digital Versatile Disk) and the like in the form of installable or executable file.

Further, the programs executed in the reading apparatus 10 and the POS terminal 20 of the present embodiment may be stored in a computer connected with a network such as Internet, and downloaded via the network. Further, the programs executed in the reading apparatus 10 and the POS terminal 20 of the present embodiment may also be provided or distributed via a network such as the Internet.

Figure 7:
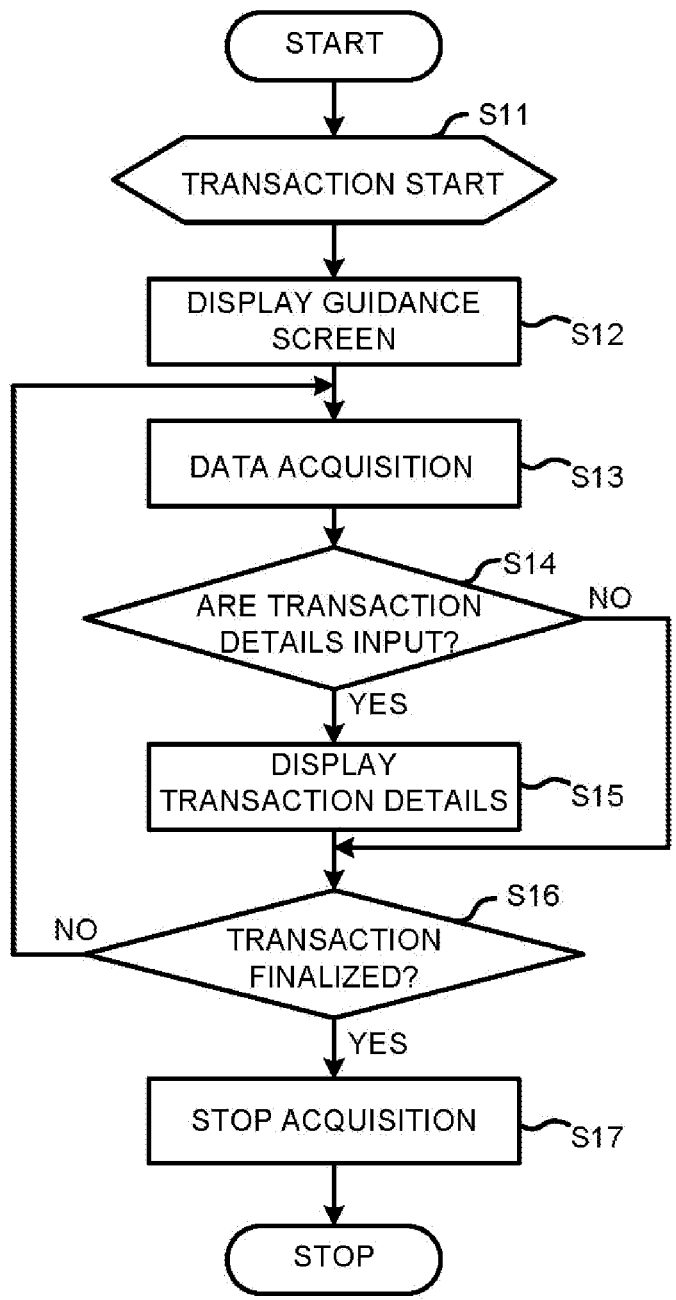
FIG. 7 is a flowchart illustrating an example of reading processing carried out by the reading apparatus.

Operation of the POS system 1 is described. First, the reading processing carried out by the reading apparatus 10 is described with reference to FIG. 7. FIG. 7 is a flowchart illustrating an example of the reading processing carried out by the reading apparatus 10.

If the start of the transaction is instructed (ACT S11), the display control section 42 of the reading apparatus 10 displays a message or an image for instructing the reading by the reading section 15 on the second display section 16 as a guidance screen through the cooperation with the display control section 52 of the POS terminal 20 (ACT S12).

Next, the acquisition control section 41 starts to acquire images and additional information from the image capturing section 12 and the reading section 15 (ACT S13). In this way, the acquired images and additional information are sent to the POS terminal 20.

When the transaction is started, the operator of the reading apparatus 10 holds each commodity to be purchased over the image capturing window 11a one by one to photograph the commodities in sequence. In this way, the images of the commodities are output sequentially from the image capturing section 12.

On the other hand, in the reading apparatus 10 of the present embodiment, the customer inputs various kinds of information by himself/herself through the reading section 15 oriented to the customer side. Thus, the customer can hold his/her own communication-realizable object in front of the reading section 15 to input additional information such as the membership number and the like while the commodities are read by the operator. In this way, since the reading (photographing) of the commodities and the reading of the additional information can be carried out in parallel, the efficiency of the reading work can be improved. Further, since labor and time of showing, for example, the information communication terminal to the operator by the customer can be saved, customer convenience can be enhanced.

Next, the display control section 42 determines whether or not the display data of the transaction details is input from the POS terminal 20 (ACT S14). If it is determined that the display data of the transaction details is not input (NO in ACT S14), the processing in ACT S16 is executed. If it is determined that the display data of the transaction details is input (YES in ACT S14), the display control section 42 displays the transaction details on the first display section 13 and the second display section 16 (ACT S15), and then the processing in ACT S16 is executed.

The microcomputer 101 of the reading apparatus 10 executes the processing in ACT S13-ACT S15 repeatedly (NO in ACT S16) until the transaction is finalized through an operation on the POS terminal 20. Then if an instruction for finalizing the transaction is received (YES in ACT S16), the acquisition control section 41 stops the acquisition of the images and the additional information from the image capturing section 12 and the reading section 15 (ACT S17), and then the present processing is terminated.

Figure 8:
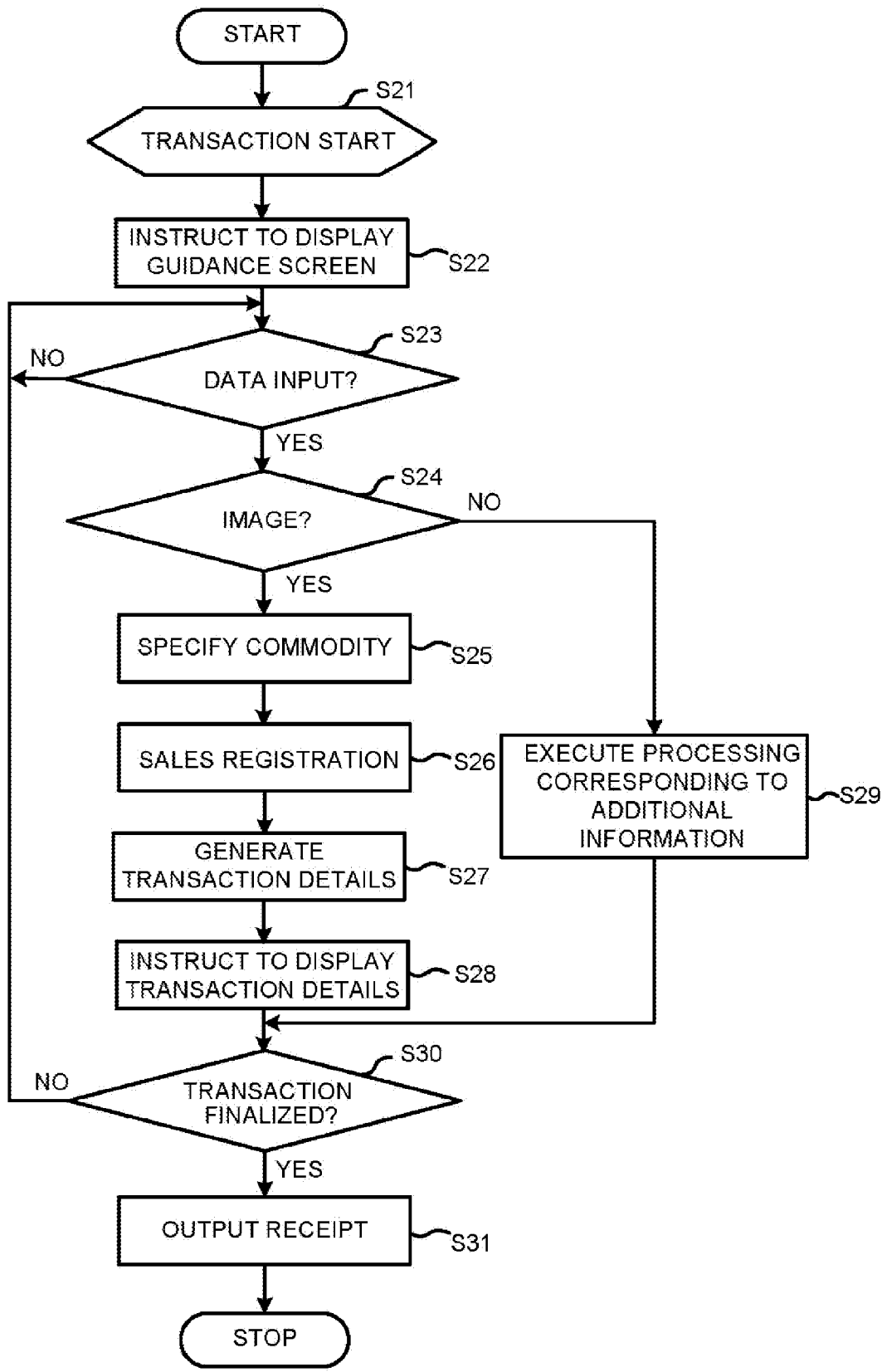
FIG. 8 is a flowchart illustrating an example of sales registration processing carried out by the POS terminal.

Next, the sales registration processing carried out by the POS terminal 20 is described with reference to FIG. 8. FIG. 8 is a flowchart illustrating an example of the sales registration processing carried out by the POS terminal 20.

If the start of the transaction is instructed (ACT S21), the display control section 52 of the POS terminal 20 displays a guidance screen for instructing the reading by the reading section 15 on the second display section 16 through the cooperation with the display control section 42 of the reading apparatus 10 (ACT S22).

Next, the sales registration section 51 waits until an image or additional information is input from the reading apparatus 10 (NO in ACT S23). In a case in which an image acquired from the image capturing section 12 is input (YES in ACT S23, and YES in ACT S24), the sales registration section 51 specifies the commodity corresponding to the image from the commodity master file (ACT S25). The sales registration section 51 executes sales registration processing of the specified commodity (ACT S26).

Next, the display control section 52 of the POS terminal 20 generates the display data of the transaction details (commodity name, commodity price, total amount and the like) corresponding to the sales registration (ACT S27). The display control section 52 displays the transaction details (display data) on the first display section 13 and the second display section 16 through the cooperation with the display control section 42 of the reading apparatus 10 (ACT S28).

The transaction details in the second display section 16 may be displayed together with the guidance screen; alternatively, the detail screen is displayed after the guidance screen is deleted. For example, in a case in which the additional information read by the reading section 15 is already received, the guidance screen is deleted; otherwise, the guidance screen may be resized to a reduced area and the detail screen is displayed in the remaining area to display both screens on the second display section 16.

shrunk and the like to display the detail screen.

On the other hand, in a case in which the additional information acquired from the reading section 15 is input (YES in ACT S23, and NO in ACT S24), the sales registration section 51 executes the processing corresponding to the content of the additional information (ACT S29). The processing result in ACT S29 and the like may be displayed on the first display section 13 and the second display section 16.

The microcomputer 201 of the POS terminal 20 executes the processing in ACT S23-ACT S29 repeatedly (NO in ACT S30) until a closing key (not shown) on the keyboard 14 is operated to finalize the transaction. If finalization of the transaction is declared through the operation on the closing key (YES in ACT S30), the microcomputer 201 of the POS terminal 20 outputs the transaction details and the processing result in ACT S29 from the receipt printer 23 (ACT S31), and then the present processing is terminated.

As stated above, in accordance with the present embodiment, the image capturing section 12 for operator and the reading section 15 for customer are used, and thus reading operations of various kinds of information relating to the transaction (sales registration) can be carried out in parallel with one another. Therefore, the work efficiency relating to the reading work can be improved and customer and shop clerk convenience can be enhanced. Since the reading section 15 is arranged at the upper surface 11b of the reading apparatus 10 (main body 11), the space of the upper surface 11b at which the second image capturing section 15 is mounted is used effectively and thus the reading apparatus 10 can be minimized.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, it is exemplified in the embodiment described above that the display control section 52 of the POS terminal 20 controls display in the reading apparatus 10, however, it is not limited to this. For example, the display control section 42 of the reading apparatus 10 may include the whole or part of the functions of the display control section 52, in this way, the display control section 42 of the reading apparatus 10 can control display by itself. Further, the reading apparatus 10 may include the whole or part of the functions of the sales registration section 51. For example, it is applicable to carry out the specification of the commodity from the image captured by the image capturing section 12 at the side of the reading apparatus 10, and then output the result to the POS terminal 20 together with the additional information.

Furthermore, it is exemplified in the embodiment described above that the POS system 1 is constituted with the reading apparatus 10 (vertical scanner) and the POS terminal 20 which are separated, however, the present invention is not limited to this. For example, the POS system 1 may be constituted with the reading apparatus 10 and the POS terminal 20 which are integrated.

What is claimed is:

1. A reading apparatus, arranged at a position between an operator and a customer who stand in a face to face manner, comprising:
   a main body having an opening on a side facing the operator;
   an image capturing section, housed in the main body, configured to capture an image of a commodity when the operator holds the commodity to be purchased over the opening;
   a sales registration processing section that specifies the commodity corresponding to the captured image and performs sales registration of the commodity;
   a reading section for a customer, attached to the main body and positioned under and substantially parallel to an upper surface of the main body, configured to perform near field communication with an object held over the upper surface of the main body by the customer to read specified additional information stored in the object, wherein the upper surface is inclined to such a degree that it prevents the object from being placed on the upper surface without the object sliding off the upper surface; and
   a first display section for the operator, arranged above the opening of the main body, configured to display information relating to the sales registration processing, wherein the displayed information relating to the sales registration processing is updated based on the additional information read from the object.

2. The reading apparatus according to claim 1, wherein the the upper surface of the main body is inclined downwards from the side facing the operator to a side facing the customer.

3. The reading apparatus according to claim 2, wherein the reading section is arranged directly below the inclined surface.

4. The reading apparatus according to claim 1, further comprising second display section for the customer, arranged nearby the reading section, configured to display a guidance screen instructing the customer of an operation of the reading section so that the object is held over the reading section.

5. The reading apparatus according to claim 1, wherein the sales processing section is further configured to execute the sales registration processing by specifying the commodity corresponding to the captured image based on commodity master file.

* * * * *